US007041382B2

(12) United States Patent
Hamahara et al.

(10) Patent No.: US 7,041,382 B2
(45) Date of Patent: May 9, 2006

(54) COATED STEEL SHEET PROVIDED WITH ELECTRODEPOSITION PAINTING HAVING SUPERIOR APPEARANCE

(75) Inventors: Kyoko Hamahara, Tokyo (JP); Hisatada Nakakoji, Tokyo (JP); Chiaki Kato, Tokyo (JP); Nobuhiko Uesugi, Tokyo (JP); Kazumasa Yoshida, Tokyo (JP); Katsuhiro Takebayashi, Tokyo (JP)

(73) Assignee: JFE Steel Corporation, (JP)

( * ) Notice: Subject to any disclaimer, the term of this patent is extended or adjusted under 35 U.S.C. 154(b) by 217 days.

(21) Appl. No.: 10/628,752

(22) Filed: Jul. 28, 2003

(65) Prior Publication Data

US 2004/0018376 A1 Jan. 29, 2004

(30) Foreign Application Priority Data

Jul. 29, 2002 (JP) ............................ 2002-219892

(51) Int. Cl.
*B32B 15/04* (2006.01)
*B32B 15/08* (2006.01)
*B32B 15/18* (2006.01)

(52) U.S. Cl. ...................... 428/612; 428/624; 428/626; 428/632; 428/659; 428/687

(58) Field of Classification Search ................ 428/626, 428/659, 612, 687, 624, 632, 684
See application file for complete search history.

(56) References Cited

U.S. PATENT DOCUMENTS

| | | | | |
|---|---|---|---|---|
| 4,292,097 | A * | 9/1981 | Nakazato et al. | 148/506 |
| 4,711,917 | A * | 12/1987 | McCollum et al. | 523/400 |
| 4,775,599 | A * | 10/1988 | Matsuoka et al. | 428/600 |
| 5,183,836 | A * | 2/1993 | Kishi et al. | 523/404 |
| 5,656,148 | A * | 8/1997 | Martyak et al. | 205/311 |
| 5,795,660 | A * | 8/1998 | Yoshimi et al. | 428/626 |
| 5,853,850 | A * | 12/1998 | Iwai et al. | 428/148 |
| 6,555,249 | B1 * | 4/2003 | Hamahara et al. | 428/632 |
| 2003/0012978 | A1 * | 1/2003 | Sodani et al. | 428/659 |

FOREIGN PATENT DOCUMENTS

| | | |
|---|---|---|
| JP | 61-253397 | * 11/1986 |
| JP | 02-175007 | * 7/1990 |
| JP | 03-079341 | * 4/1991 |
| JP | 06-155656 | * 6/1994 |
| JP | 06-246306 | * 9/1994 |
| JP | 06-269803 | * 9/1994 |
| JP | 08-003782 | * 1/1996 |
| JP | 08-209303 | * 8/1996 |
| JP | 09-263967 | * 10/1997 |
| JP | 2001-152355 | * 6/2001 |
| JP | 2002-004019 | * 1/2002 |
| JP | 2003-013192 | * 1/2003 |

* cited by examiner

*Primary Examiner*—John J. Zimmerman
(74) *Attorney, Agent, or Firm*—DLA Piper Rudnick Gray Cary US LLP

(57) ABSTRACT

A coated steel sheet composed of a steel sheet and at least two types of coating layers formed thereon is provided with an electrodeposition painting having a superior appearance. The coated steel sheet has an arithmetic mean roughness Ra, which is defined by JIS B 0601-1994, of from about 0.7 to about 1.5 μm and a peak per inch PPI of from about 180 to about 250.

12 Claims, 5 Drawing Sheets

1mm (B)

1mm (A)

1mm (B)

1mm (C)

COATED STEEL SHEET PROVIDED WITH ELECTRODEPOSITION PAINTING HAVING SUPERIOR APPEARANCE

BACKGROUND

1. Field of the Invention

This invention relates to coated steel sheets each provided with an electrodeposition painting having a superior appearance, and more particularly, relates to a coated steel sheet provided with an electrodeposition painting having a superior appearance, in which the coated steel sheet is preferably used for automobile bodies, home electrical appliances, and the like and is capable of forming a superior finished coat on a surface of the steel sheet which is rubbed in press forming and the like.

2. Description of the Related Art

A coated steel sheet comprising a zinc-based plated layer has superior corrosion resistance and has been widely used in, for example, automobile bodies and home electrical appliances. In particular, in Japan, a coated steel sheet comprising a zinc-nickel alloy plated layer or a zinc-iron alloy plated layer has been primarily used for automobile applications.

A coated steel sheet comprising a zinc-nickel alloy plated layer is manufactured by an electroplating method, and in this method, the content of nickel (Ni) is strictly controlled in a very narrow region (generally, 12 ±1 mass %). Hence, when the coated steel sheet described above is manufactured, a highly advanced manufacturing technique must be used, and in addition, due to the use of Ni, the manufacturing cost is increased. On the other hand, a coated steel sheet comprising a zinc-iron alloy plated layer is manufactured by a hot-dip plating method or an electroplating method. When the coated steel sheet described above is manufactured, since the content of iron must be precisely controlled, a highly advanced manufacturing technique must be used. In addition, when a hot-dip plating method is used, since the plated layer obtained thereby is inferior in terms of press formability as compared to the zinc-nickel alloy plated layer described above, a second coating layer is generally formed on the surface of the plated layer for improving the press formability.

In recent years, in the automobile manufacturing industry, concomitant with the trend toward the globalization and sharing of automobile components, the use of a coated steel sheet, which is inexpensive and which can be easily manufactured, has been increased all over the world, and in Japan, the use of a zinc plated steel sheet (manufactured by electroplating or hot-dip plating, not followed by heating for alloying) has begun to take over the use of a coated steel sheet comprising a zinc-iron alloy layer manufactured by hot-dip plating and a coated steel sheet comprising a zinc-nickel alloy plated layer manufactured by electroplating. In Europe, performances of press dies, welders, and the like are improved by users of coated steel sheets, and in order to improve the press formability thereof, for example, a zinc phosphate layer is formed on a plated layer by producers of coated steel sheets. The zinc phosphate layer thus formed as a second coating layer has the effect of retaining oil in gaps between crystal grains thereof and also has the effect of preventing the zinc plated layer from being directly brought into contact with a press die, that is, the effect of functioning as a buffer, and hence it has been believed that the press formability is improved.

Among the coated steel sheets, for example, a zinc plated steel sheet used for outer plates of automobile bodies or the like is frequently processed by press forming in an automobile manufacturing process. Subsequently, the zinc plated steel sheet thus pressed is processed by electrodeposition painting to form an under painting thereon to rustproof the steel sheet, followed by finish painting performed using a spray system, such as automobile primary painting and top painting, for a good external appearance, thereby forming an automobile component.

The external surfaces of automobiles are particularly important in appearance, and hence superior clarity after painting has been required. As a coated steel sheet which can meet the requirement described above, a coated steel sheet provided with an electrodeposition painting having small surface irregularities is preferably used.

When a zinc plated steel sheet processed by phosphate treatment is used, the appearance of an electrodeposition painting formed on a surface, which is rubbed in press forming, of the steel sheet described above is inferior in some cases, and a panel formed from the steel sheet described above must be disadvantageously processed by surface treatment, such as polishing so that the surfaces are smoothed, in an automobile manufacturing process.

In a coated steel sheet, irregularities of a surface of the base steel sheet are naturally reflected in those of the surface obtained after an electrodeposition painting is performed. In addition, when the surface resistance of the coated steel sheet is large, an electrodeposition painting having an irregular thickness is formed since current flows unevenly through local areas during electrodeposition painting, and as a result, a base steel sheet having small surface irregularities may have large surface irregularities after electrodeposition painting in some cases.

In the related coated steel sheet described above, for example, when a film having a large surface resistance, such as an organic film, is provided on the surface of the base steel sheet, a method for decreasing the surface resistance of the steel sheet by imparting hydrophilic properties has been proposed (Japanese Patent No. 2922426 and the like).

However, the method or the technique described above for obtaining a superior painting appearance, in which the surface resistance of the base steel sheet is decreased to improve the uniformity of an electrodeposition painting itself, can only be applied to an organic composite coated steel sheet which comprises an organic film on the surface the base steel sheet.

In the case other than the organic composite coated steel sheet, only one method has been proposed for improving the coating appearance, in which the surface roughness of a base steel sheet itself is decreased.

For example, Japanese Unexamined Patent Application Publication No. 9-263967 discloses a method in which a superior painting appearance is obtained by controlling the roughness of a base steel sheet. In that method, the product of a filtered center-line waviness (Wca) and a peak per inch (PPI) of a surface of a hot-dip zinc plated steel sheet is controlled to be 40 or less, or Wca and PPI are controlled to be 0.5 μm or less and 80 or less, respectively, to decrease surface irregularities of the base steel sheet itself for improving the clarity after the painting. However, according to the method described above, the painting is performed by paint application or roll coating. Hence, electrodeposition painting is not used. Since the irregularities of the surface of the base steel sheet are reflected, the clarity after painting is improved when the Wca and PPI are decreased. However, the appearance of an electrodeposition painting, which is influenced by the surface resistance and is formed on a surface of the steel sheet to be rubbed in press forming, is not described at all.

In addition, Japanese Examined Patent Application Publication No. 5-83628 has disclosed an alloyed hot-dip zinc-plated steel sheet (galvannealed steel sheet) in which the surface roughness of a base steel sheet is controlled. In that publication, the roughness Ra and PPI of the base steel sheet are set to 1.0 μm or less and 250 or more, respectively, to improve the press formability by decreasing frictional resistance to sliding of a die. The reason the PPI is set to 250 or more relates to a specific alloy crystal structure obtained by alloyed hot-dip zinc plating, there is no description about the appearance of an electrodeposition painting formed on a surface of the steel sheet which is rubbed in press forming, sliding, or the like.

In addition, Japanese Unexamined Patent Application Publication Nos. 6-246306 and 6-269803 disclose a steel sheet having superior painting clarity and press formability. In the steel sheet mentioned above, the Ra at a concave portion of the steel sheet is set to 0.8 μm or less, and the size of a peak of a convex portion and the distance between the convex portions are controlled. In addition, the height of a convex portion of the steel sheet at an inner surface side in press forming is set to be larger than that at an outer surface side, the area ratio of the concave portions at the inner surface side is set to 70% to 96%, and the average area ratio thereof is set to be smaller than that at the outer surface side, thereby obtaining superior coating clarity even after press forming. That is, the roughness profiles of the front and the rear surfaces are made different from each other so that the superior painting clarity is obtained even after press forming. Among the factors relating to the roughness, the Ra of the concave portions, the area ratio thereof, and the like are determined to obtain superior clarity after painting, and the specific values of the convex portion are determined to improve the press formability. In addition, the reason the painting clarity after press forming is degraded is that the surface roughness of a steel sheet is changed by press forming and an undulation component on one side surface of the steel sheet is clearly transferred on the opposite surface thereof by a pressure applied thereto. Hence, the roughness profiles on the front and the rear surfaces are made different from each other. In that method, in consideration of the roughness after press forming, the change of the surface roughness caused by press forming is estimated beforehand, and the roughness profiles on the front and the rear surfaces are determined to decrease the change thereof. Hence, it is considered that the method described above may be effectively applied to a cold-rolled steel sheet or a coated steel sheet containing only one layer. However, sufficient improvement cannot be obtained by the method described above for a coated steel sheet containing at least two layers. In addition, in the method described above, for example, since the roughness control must be differently performed between the front and the rear surfaces, the area, the height, and the like of the convex portions must be controlled, and a roller must be frequently replaced, the manufacturing of products may become complicated in some cases.

In addition, in the related techniques described above, the evaluation is performed by using a cold-rolled steel sheet or a coated steel sheet right after the production thereof. That is, in Japanese Unexamined Patent Application Publication Nos. 6-246306 and 6-269803, concerning the paintability, there has been no description about the appearance of an electrodeposition painting formed on a surface of the steel sheet which is rubbed in press forming, sliding, or the like.

However, in an actual automobile manufacturing process, after processing by press forming, welding, polishing performed together with an appearance check, and like, a coated steel sheet is conveyed to a painting step, and after treatment using phosphate is performed as a pre-treatment step, electrodeposition painting is performed. Accordingly, although a steel sheet having superior painting clarity can be obtained from a coated steel sheet by a laboratory experiment based on the related techniques described above, when the steel sheet described above is treated by electrodeposition painting after being processed by the manufacturing steps described above, the appearance of the electrodeposition painting may be degraded in some cases. This appearance is apparently different from the appearance of the electrodeposition painting formed on the surface of the coated steel sheet, which is not rubbed in press forming, sliding, or the like, by the laboratory experiment described above. From the result described above, the evaluation of the appearance of an electrodeposition painting formed on a surface of a coated steel sheet, the surface being rubbed in press forming beforehand as is that used for automobile applications or the like, is apparently different from the evaluation of the appearance of the electrodeposition painting formed on a surface of a coated steel sheet by a laboratory experiment, the surface not being rubbed in press forming, sliding, or the like. That is, it is clearly understood that, even when a superior evaluation result of the appearance of the electrodeposition painting is obtained by a laboratory experiment, since the use conditions of the coated steel sheet are apparently different from those at the user side, the evaluation result obtained by a laboratory experiment naturally different from that obtained at the user side. Hence, to obtain the same evaluation result as that obtained under actual use conditions, the appearance of an electrodeposition painting formed on a surface of a steel sheet, which is rubbed in press forming or is processed by a friction test before electrodeposition painting, is evaluated in a laboratory experiment. In addition, at the user side where a coated steel sheet is used, to improve the appearance having surface damages generated in press forming, polishing of surfaces of the coated steel sheet may be performed before electrodeposition painting in some cases, and as a result, depending on type of coated steel sheet, a problem may arise in some cases in that a polishing pattern is clearly observed on the surface of the steel sheet after electrodeposition painting is performed. In the case described above, it is also understood that when electrodeposition painting is performed on a surface of a steel sheet, which is actually polished, the appearance of the electrodeposition painting can be correctly evaluated.

OBJECT OF THE INVENTION

Accordingly, an object of the present invention is to provide a coated steel sheet provided with an electrodeposition painting having a superior appearance, in which the coated steel sheet is capable of forming a superior finish paint on a surface of the steel sheet which is rubbed in the press forming, sliding, and the like.

SUMMARY OF THE INVENTION

To this end, in accordance with one aspect of the invention, a coated steel sheet which is provided with an electrodeposition painting having a superior appearance, the coated steel sheet comprises a steel sheet; and at least two types of coating layers on the steel sheet. The coated steel sheet described above has surface roughness properties, in which an arithmetic mean roughness Ra, which is defined by JIS B 0601-1994, is in the range of from about 0.7 to about 1.5 μm and a peak per inch PPI is in the range of from about 180 to about 250.

In a spectral analysis obtained by the Fourier transformation of a surface roughness measurement curve, the area obtained from an amplitude curve in the range of from 25 to 200 μm in wavelength is preferably about 25% or more of the area obtained from the amplitude curve in the range of from 25 to 1,000 μm in wavelength.

The coating layers are preferably a first coating layer formed on the steel sheet and a second coating layer formed on the first coating layer. In addition, the first coating layer may be a layer selected from the group consisting of an electroplated layer, a hot-dip plated layer, and a chemical conversion layer, and the second coating layer may be a layer selected from the group consisting of a zinc phosphate layer and a chromate layer.

In addition, the coating layers are preferably a first coating layer formed on the steel sheet, a second coating layer formed on the first coating layer, and a third coating layer formed on the second coating layer. The first coating layer may be a layer selected from the group consisting of an electroplated layer, a hot-dip plated layer, and a chemical conversion layer. The second coating layer may be a layer selected from the group consisting of a zinc phosphate layer and a chromate layer. The third layer may be a layer selected from the group consisting of an organic layer, an inorganic layer, and a chemical conversion layer.

The arithmetic means roughness Ra is preferably in the range of from about 0.8 to about 1.3 μm.

The peak per inch PPI is preferably in the range of from about 190 to about 240.

In addition, in accordance with another aspect of the invention, a coated steel sheet provided with an electrodeposition painting having a superior appearance, the coated steel sheet comprises: a steel sheet; a zinc-based plated layer formed on a surface of the steel sheet; and a zinc phosphate layer formed on a surface of the plated layer. The coated steel sheet described above has surface roughness properties, in which an arithmetic mean roughness Ra, which is defined by JIS B 0601-1994, is in the range of from about 0.7 to about 1.5 μm and a peak per inch PPI is in the range of from about 180 to about 250.

In a spectral analysis obtained by the Fourier transformation of a surface roughness measurement curve, the area obtained from an amplitude curve in the range of from 25 to 200 μm in wavelength is preferably about 25% or more of the area obtained from the amplitude curve in the range of from 25 to 1,000 μm in wavelength.

The zinc-based plated layer preferably has a plating amount of about 20 to about 60 $g/m^2$.

The zinc phosphate layer preferably has a coating amount of about 1.0 to about 3.0 $g/m^2$.

The arithmetic means roughness Ra described above is preferably in the range of from about 0.8 to about 1.3 μm.

The peak per inch PPI described above is preferably in the range of from about 190 to about 240.

DETAILED DESCRIPTION

Through intensive research carried out by us on factors which influence the appearance of an electrodeposition painting formed on a surface which is brought into contact with a die in press forming and is rubbed therewith, the problems described above could be overcome by defining the surface roughness properties. First, a process will be described in detail in which we surprisingly discovered that the factor influencing the appearance of the electrodeposition painting was the surface roughness of the coated steel sheet before press forming or the like is performed.

We used zinc plated steel sheets A, B, and C (hereinafter referred to as products A, B, and C, respectively), which were processed by phosphate treatment, having different surface roughness properties as shown in Table 1, and the surfaces of the steel sheets described above were observed and analyzed by fully using various analytical devices at individual steps performed under the following three different conditions. The three different conditions are as follows: condition 1 in which press forming is not performed, chemical conversion treatment shown in an example is performed, and electrodeposition painting is then performed; condition 2 in which a surface rubbed in press forming is processed by the chemical conversion treatment as is condition 1, and electrodeposition painting is then performed; and condition 3 in which after polishing, the chemical conversion treatment described above is performed, followed by electrodeposition painting. In addition, press forming is performed by using a pressing machine to form an automobile body component.

Figure 2:
FIG. 2 is a SEM micrograph of a surface of product A of a comparative example, the surface being rubbed in press forming.
Figure 3:
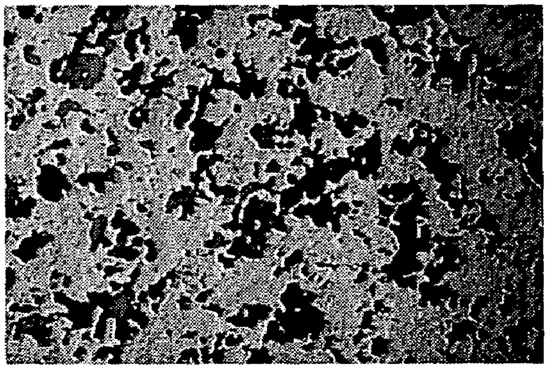
FIG. 3 is a SEM micrograph of a surface of product B of an example of the invention, the surface being rubbed in press forming.
Figure 4:
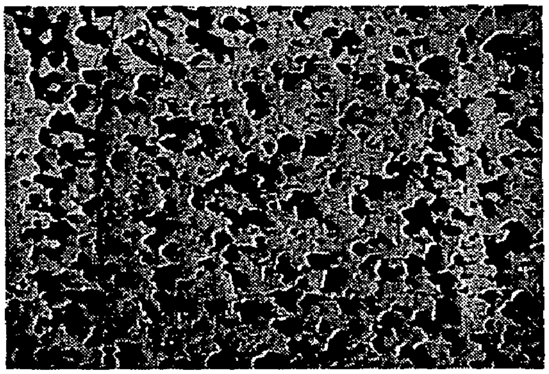
FIG. 4 is a SEM micrograph of a surface of product C of an example of the invention, the surface being rubbed in press forming.

FIGS. 2, 3, and 4 show the surface conditions of products A, B, and C, respectively, in which the surfaces thereof are rubbed in press forming. FIGS. 2, 3, and 4 are SEM micrograph of the surfaces, and in the figures, black areas indicate portions which are damaged when the surfaces are brought into contact with a die in press forming.

TABLE 1

| Product | A[1)] | B[2)] | C[3)] |
|---|---|---|---|
| Surface Roughness Ra (μm) of Product | 0.7 | 1.1 | 0.9 |
| Condition 1: Surface Roughness Ra (μm) of Electrodeposition painting without Press Forming | 0.23 | 0.27 | 0.24 |
| Condition 2: Surface Roughness Ra (μm) of Electrodeposition painting after Press Forming | 0.35 | O.30 | 0.24 |
| Condition 3: Surface Roughness Ra (μm) of Electrodeposition painting after Polishing | 0.39 | 0.32 | 0.27 |

[1)]to [3)]: PPIs of products A, B, and C are 140, 200, and 200, respectively.

Since having a Ra of 0.7 μm and an PPI of 140, product A has small surface irregularities and a small number of peaks. When product A is processed by press forming, the surface thereof which is rubbed thereby has the surface conditions shown in FIG. 2, and due to the surface conditions described above, the finished surface of the electrodeposition painting performed thereon is degraded. In addition, the surface roughness of product B is larger than that of product A since the surface roughness Ra and the PPI of product B are 1.1 μm and 200, respectively. As a result, the surface roughness of an electrodeposition painting formed on an unprocessed surface of product B is larger than that of product A. However, since the surface of product B which is rubbed has the surface condition shown in FIG. 3, a finished surface of the electrodeposition painting formed on the steel sheet is not as degraded as compared to that of product A, thereby obtaining a superior appearance to that of product A.

From the results described above, it is understood that, in the surface which is brought into contact with and rubbed by a die, when portions at which peaks (peaks on the steel sheet surface) are damaged by the die each have a small area, and the number thereof is large, the finished surface of the electrodeposition painting is superior, and that, on the other hand, when portions at which the peaks are damaged by the die each have a large area, and the number thereof is small, the finished surface of the electrodeposition painting is inferior.

In addition, although product C has a surface shape in which the Ra is 0.9 μm and the PPI is 200, after being rubbed in press forming or polishing, product C has a significantly superior finished surface of the electrodeposition painting. The surface of product C which is rubbed in press forming is shown in FIG. 4. The PPI is the same as that of product B, and as with product B, product C has a great number of portions at which peaks (peaks on the steel sheet surface) are damaged by the die, each portion having a small area. However, the distributions of the portions described above are different from each other. That is, in product B, although being small, the portions described above are gathered, and on the other hand, in product C, the portions are small and evenly distributed.

Figure 5A:
FIG. 5A is a schematic cross-sectional view showing the surface shape of product A.
Figure 5B:
FIG. 5B is a schematic cross-sectional view showing the surface shape of product B.
Figure 5C:
FIG. 5C is a schematic cross-sectional view showing the surface shape of product C.

The schematic cross-sections of the surfaces of products A, B, and C are as shown in FIG. 5A, 5B, and 5C, respectively. When a large number of small convex portions (peak portions) of the steel sheet surface are evenly distributed, the degradation in finished surface of the electrodeposition painting can be significantly reduced even when press forming or polishing is performed, and it is believed that the finished surface thereof is almost equivalent to that obtained when press forming or polishing is not performed.

In addition, it is also understood that when the portion damaged by a die as described above is analyzed by using a microscope or an X-ray microanalyser, the zinc phosphate layer is partly or entirely removed. In addition, it is also understood that when the portion described above is processed by chemical conversion treatment used for automobile application, the chemical conversion film thereof is difficult to form. In condition 3 in which polishing is performed, since the results obtained from products A, B, and C are equivalent to those in the case in which press forming is performed, the description thereof is omitted.

In the case in which a steel sheet is treated by chemical conversion treatment for automobile application or electrodeposition painting without press forming or polishing, since the surface of the steel sheet is uniformly covered with a zinc phosphate layer, a current flows uniformly along the surface thereof in electrodeposition painting. Hence, a uniform electrodeposition painting is formed along the surface of the steel sheet, and from this point of view, the steel sheet itself preferably has small surface roughness (Ra, Wca). However, when press forming or polishing is performed, at convex portions of the steel sheet which are brought into contact with a press die or grinding stones, the zinc phosphate layer is partly removed. Hence, in electrodeposition painting, the current flows unevenly through concave portions of the steel sheet, which are not brought into contact with the die or the like, and the concentration of the current occurs at local areas in electrodeposition painting. This results in an electrodeposition painting having uneven thickness distribution.

Figure 6A:
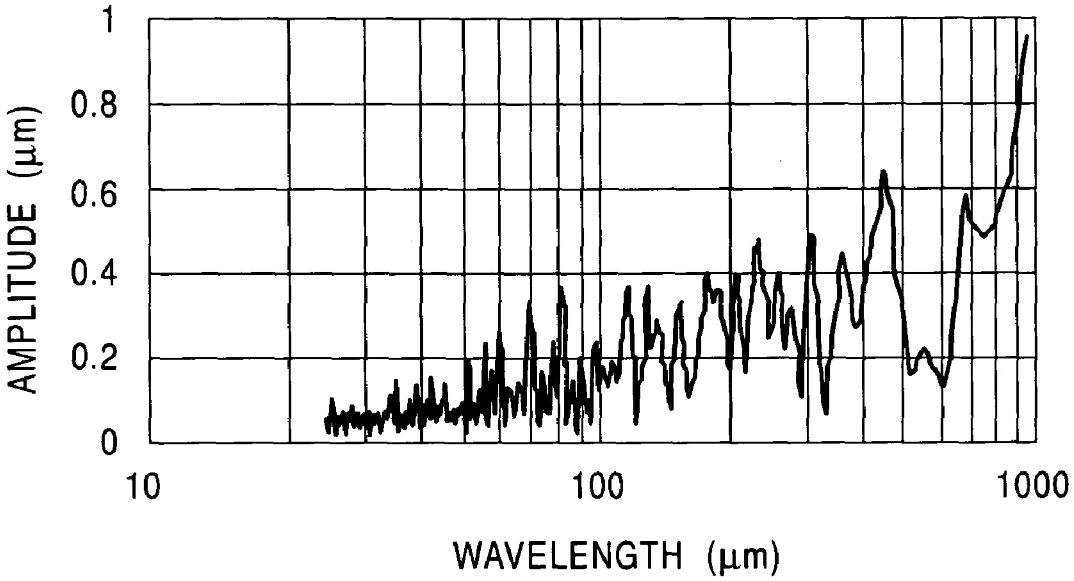
FIG. 6A is a graph showing a spectral analysis obtained by the Fourier transformation of a surface roughness measurement curve of a steel sheet.
Figure 6B:
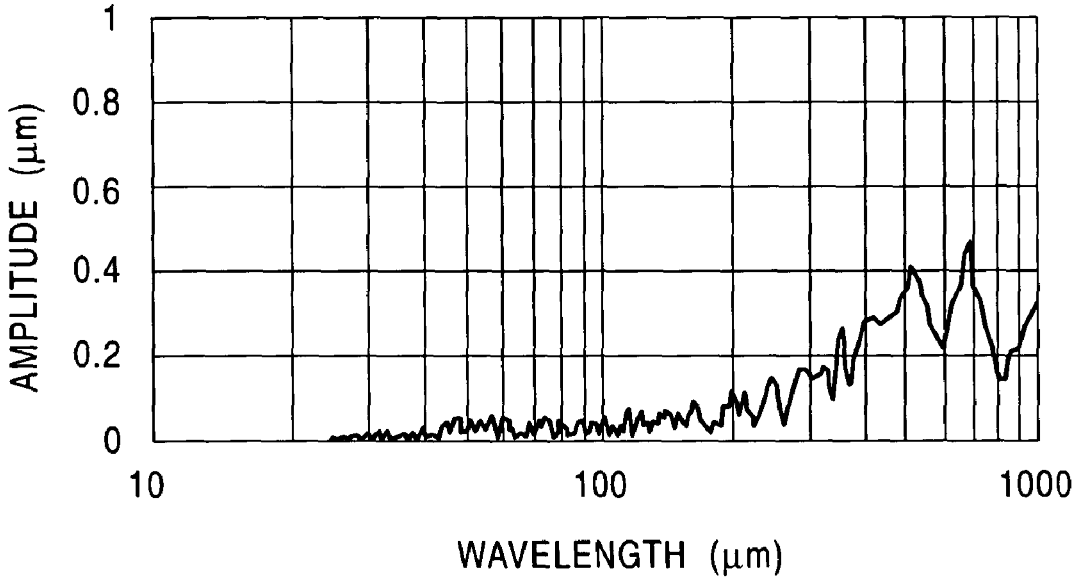
FIG. 6B is a graph showing a spectral analysis obtained by the Fourier transformation of a surface roughness measurement curve of a coating layer formed by electrodeposition painting on the steel sheet in FIG. 6A.

In the case of product C, the reason the finished surface of the electrodeposition painting formed on the rubbed surface of the steel sheet is significantly improved is further explained. In FIG. 6A and 6B, the results of spectral analysis of the surface of product B and the surface of an electrodeposition painting without forming are shown. It is understood that the amplitude (that is, irregularities) in a wavelength (cycle) of approximately 200 μm or less is remarkably decreased by electrodeposition painting, and that most of the irregularities in a wavelength of approximately 200 μm or more remain. The reason for this is believed to be that, in the case of electrodeposition painting, although the irregularities in a wavelength of approximately 200 μm or less are formed in coating (in electrolysis) by irregularities of an underlying steel sheet, current concentrated in limited areas, and the like, resin flows during baking and drying. Hence, the irregularities at a wavelength of approximately 200 μm or less disappear.

That is, we believe that even when large irregularities at a wavelength of approximately 200 μm or less are present on the surface of a steel sheet, the appearance of an electrodeposition painting is not influenced thereby. The reason for this is believed to be when the distance between the surface convex portions (peak portions) which are damaged by press forming or polishing described above is approximately 200 μm or less, the distance between the limited areas at which the current is concentrated becomes approximately 200 μm or less, and as a result, the irregularities disappear when the paint is baked to flow. In product C, the average distance between peaks (Sm) is equivalent to that of product B. However, since the distances between peaks are uniform and the number of peaks having a long distance therebetween is small, as compared to those of product B, the degradation in appearance of the electrodeposition painting is not significant even when being rubbed in press forming or polishing. Hence, we believe that very superior appearance of the electrodeposition painting can be obtained.

In addition, in the case of a zinc-nickel alloy plated steel sheet, since only one plated layer is formed, even when the plated layer is damaged to some extent by rubbing, a large current concentration described above is unlikely to occur in electrodeposition painting. Hence, it is understood that defects on the finished surface of the electrodeposition painting are not liable to occur.

Next, the reason the surface roughness properties of a zinc-based plated steel sheet are set so that the arithmetic mean roughness Ra is about 0.7 to about 1.5 μm and the peak per inch PPI is about 180 to about 250 will be described.

In order to prevent a convex portion on a surface of the steel sheet damaged by a die in press forming from being brought into contact with adjacent convex portions which are also damaged, the Ra and the PPI are set to be high. When the arithmetic mean roughness Ra is less than about 0.7 μm, the damaged peak on the surface is brought into contact with adjacent damaged peaks, and when the peak per inch PPI is less than about 180, since the number of peaks is excessively small, for example, serious damage may be done to the second coating layer of the zinc plated steel sheet, that is, to the zinc phosphate layer. Accordingly, in both cases described above, the appearance of the electrodeposition painting is degraded. In addition, when the peak per inch PPI is less than about 180, the distance between peaks is naturally increased, and an undulation component of the surface is adversely influenced, thereby causing degradation in appearance of the electrodeposition painting. Hence, the surface roughness properties of the zinc-based plated steel sheet are determined so that the arithmetic mean roughness is about 0.7 μm or more and the peak per inch PPI is about 180 or more. On the other hand, when the arithmetic mean roughness Ra is more than about 1.5 μm, since the surface irregularities are excessively increased, the appearance of the electrodeposition painting is degraded. In addition, when the peak per inch PPI is more than about 250, since the portions which are damaged by rubbing are brought into contact with each other, the areas thereof are increased, thereby causing degradation in appearance of the electrodeposition painting. Accordingly, the arithmetic mean roughness Ra is set to about 1.5 μm or less, and the peak per inch PPI is set to about 250 or less.

In addition, in the case in which the arithmetic mean roughness Ra is set to about 0.7 μm or more in consideration of press formability, when the zinc-based plated steel sheet is applied to a component such as an automobile outer panel having a bead of a small R, which is formed by stretch forming, the effect of retaining lubricant oil can be improved, and as a result, surface damage and breakage can be suppressed. In addition, when the arithmetic mean roughness Ra is more than about 1.5 μm, the effect of improving the press formability cannot be further enhanced, the abrasion of the surface of a roller used for temper rolling rapidly occurs, and as a result, the steel sheet having the arithmetic mean roughness Ra described above is not practically used. Furthermore, in the case in which the PPI is less than about 180, the effect of retaining lubricant oil is decreased in press forming as compared to the case in which the number of peaks is larger and the Ra is the same as that of the above case, and on the other hand, when the PPI is more than about 250, the abrasion of the surface of a roller used for temper rolling rapidly occurs.

Figure 7A:
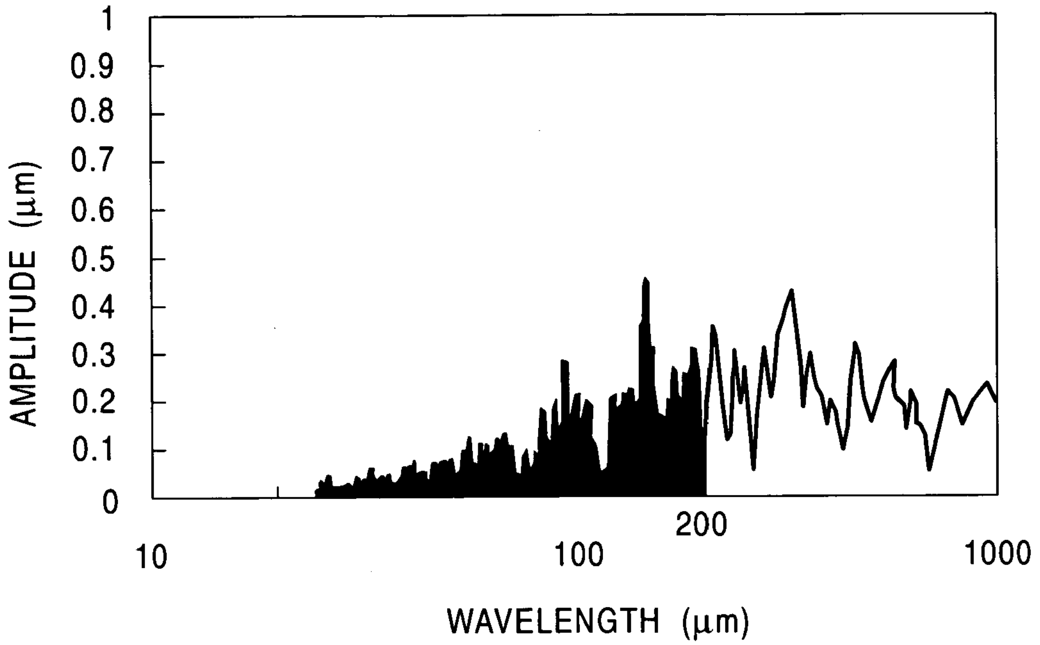
FIG. 7A is a graph showing the area obtained from an amplitude curve in the range of from 25 to 200 μm in wavelength.
Figure 7B:
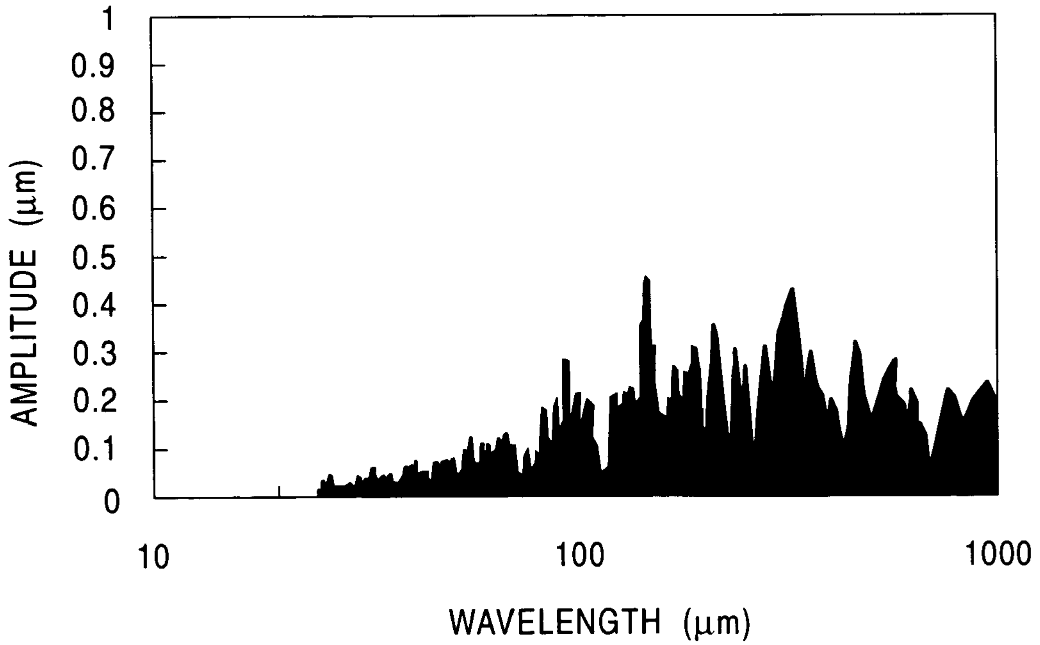
FIG. 7B is a graph showing the area obtained from an amplitude curve in the range of from 25 to 1,000 μm in wavelength.

In the spectral analysis obtained by the Fourier transformation of the surface roughness measurement curve, the reason the area of the amplitude curve in the range of from 25 to 200 μm in wavelength is about 25% or more of that in the range of from 25 to 1,000 μm in wavelength is as follows. As described above, since most of the amplitude in the range of from 25 to 200 μm disappears when the resin flows during baking of electrodeposition paint, the appearance of the electrodeposition painting is improved when the ratio in the range described above is increased. When press forming or polishing is not performed, the amplitude of the steel sheet itself is preferably small. However, when press forming or polishing is performed, the surface of the steel sheet described above is surely rubbed. Hence, since the current concentration which occurs in electrodeposition painting, that is, the appearance of the electrodeposition painting, is primarily determined by distribution of contacts between the steel sheet and a die or grinding stones, when the ratio of the amplitude in the range of from 25 to 200 μm is increased, the influence of the amplitude in a wavelength of 200 μm or more is decreased, and as a result, the degradation in appearance of the electrodeposition painting can be suppressed. FIGS. 7A and 7B are views showing a method for analyzing the area ratio.

Heretofore, the zinc-based plated steel sheet has been described. However, the coated steel sheet having the surface roughness described above is not limited to a zinc-based plated steel sheet and includes a coated steel sheet comprising a steel sheet and at least two types of coating layers provided thereon.

As the steel sheet used in the invention, a cold-rolled steel sheet or a hot-rolled steel sheet is used. In addition, the coated steel sheet of the invention comprises at least two types of coating layers. A first coating layer formed on the surface of the steel sheet may be formed by a known electroplating method, a hot-dip plating method, or a chemical conversion method. A second coating layer, such as a zinc phosphate layer or a chromate layer, provided on the surface of the first coating layer may be formed by a chemical conversion method. In addition, as a third coating layer, an organic layer having an anti-rusting effect, an inorganic layer having perforative corrosion resistance, or a chemical conversion layer may be formed on the surface of the second coating layer.

The first coating layer is preferably a zinc-based plated layer to enhance corrosion resistance. According to the coated steel sheet having the two types of coating layers and the surface roughness properties described above, by the same effects as described above, a superior finished surface of the electrodeposition painting can be formed on the surface of the steel sheet, which is rubbed by a die or the like in press forming or polishing.

In the invention, the zinc-based plated steel sheet includes a zinc plated steel sheet (a steel sheet plated with pure zinc by one of electrogalvanizing and hot-dip galvanizing), an alloyed zinc-plated steel sheet, and a zinc alloy plated steel sheet.

As typical examples of the zinc alloy plated steel sheet, for example, a zinc-nickel alloy plated steel sheet and a zinc-iron alloy plated steel sheet may be mentioned. These zinc alloy plated steel sheets may each be formed by an electroplating method using a known alloy composition.

The alloyed zinc-plated steel sheet (galvannealed steel sheet) is generally formed by the steps of immersing a steel sheet in a zinc plating bath which contains incidental impurities such as tin (Sn), iron (Fe), and aluminum (Al), and removing the steel sheet from the plating bath to form a plated layer, followed by heating and alloying treatment.

Since a coated steel sheet having a zinc-iron alloy plated layer formed by a hot-dip plating method or an electroplating method or a coated steel sheet having a zinc-nickel alloy plated layer formed by an electroplating method is difficult to form and is expensive, in recent years, the use thereof have been taken over by the use of a zinc plated steel sheet in Japan.

As has been well known, the zinc plated steel sheet may be manufactured by the steps of immersing a steel sheet in a hot-dip galvanizing bath, and removing the steel sheet therefrom to form a zinc plated layer on the surface thereof, followed by cooling without performing heating and alloying treatment, or may be manufactured by forming a zinc plated layer on a surface of a steel sheet by an electroplating method.

As for the coating layer of the zinc-based plated steel sheet, the coating weight of the first coating layer is preferably set to about 20 to about 60 g/m$^2$ per surface. When the plating amount is less than about 20 g/m$^2$, the corrosion resistance is degraded, and on the other hand, when the plating amount is more than about 60 g/m$^2$, since the corrosion resistance cannot be further improved, an unnecessary plating amount from economic point of view is formed, and in addition, the press formability and weldability may be degraded thereby in some cases. Accordingly, the plating amount is set as described above. In the case of the zinc plated steel sheet, the plated layer generally contains incidental impurities such as Sn, Fe, and Al, and to improve the corrosion resistance, each content of the incidental impurities is preferably set to about 1 mass % or less.

To improve the press formability, the second coating layer formed on the surface of the plated layer described above is preferably a zinc phosphate layer having the effect of retaining a lubricant oil in press forming, and the amount of the zinc phosphate layer is preferably set to about 1.0 to about 3.0 g/m$^2$. When the amount of the zinc phosphate layer is less than about 1.0 g/m$^2$, depending on press conditions, the effect of retaining lubricant oil may not be good enough, and as a result, a die may be directly brought into contact with the plated layer in some cases. On the other hand, when the amount of the zinc phosphate layer is more than about 3.0 g/m$^2$, coefficient of friction to the die may be increased depending on the press condition, and as a result, press formability may be degraded in some cases. In addition, to improve press formability, paint adhesion, corrosion resistance, and the like, elements, such as nickel (Ni), manganese (Mn), and magnesium (Mg), may be contained in the zinc phosphate layer. For forming the zinc phosphate layer, a general chemical conversion solution which is used in an automobile coating line may be used, and in addition, a phosphate solution, which is composed of the chemical conversion solution, mentioned above and nickel nitrate, manganese nitrate, magnesium nitrate, or the like at an optional concentration, is preferably used. In view of the adhesion of an electrodeposition painting, the appearance thereof, and the press formability, the phosphate solution described above is preferably prepared so that the content of Ni and the content of Mn in the layer are about 0.5 to about 1.4 mass % and about 3 to about 8 mass %, respectively. As the properties of the zinc phosphate layer, that is, as the second coating layer, to improve press formability, the crystal size thereof is preferably controlled to be about 3 μm or less to form a dense layer. Table 2 shows an example of the composition of the zinc phosphate solution used in a production line of the zinc plated steel sheet.

TABLE 2

| Concentration of Zinc Phosphate Solution (g/l) | | | | |
|---|---|---|---|---|
| $PO_4$ | Zn | Ni | Mn | $NO_3$ |
| 5 to 30 | 0.5 to 5 | 0.1 to 10 | 0 to 5 | 1 to 30 |

The surface roughness is controlled by controlling the surface roughness of a cold-rolled steel sheet or a hot-rolled steel sheet which is used as a base steel sheet, and it rolled with a roller which is dull finished by surface treatment, such as shot blasting, electric discharging, and laser processing.

When the coated steel sheet described above is formed by an electroplating method or a chemical conversion method, since the first coating layer is formed on the surface of the steel sheet to be approximately along the irregularities thereof, for the control of the surface roughness, the roughness of the steel sheet is preferably controlled before the first coating layer is formed. The steel sheet can be generally controlled to have a predetermined roughness pattern by adjusting the roughness of a roller used for temper rolling. In addition, when the coated steel sheet described above is manufactured by a hot-dip plating method, a steel sheet is immersed in a hot-dip plating bath to form the first coating layer on the surfaces thereof. In this step, the irregularities of the surface of the steel sheet before plating are likely to be filled with plating material, and as a result, the surface roughness of the surface of the steel sheet after plating is different from that before plating. Hence, it is preferable that the temper rolling be performed after plating and the roughness of the roller therefor be adjusted at that stage. In addition, it has been well known that 100% of a roughness pattern of the roller used for temper rolling is not entirely transferred, approximately 40 to 50% of the Ra value of the surface of the roller is transferred to the steel sheet side, and approximately 80% of the PPI value thereof is transferred. Accordingly, to obtain a coated steel sheet having the surface roughness properties in which the arithmetic mean roughness Ra is about 0.7 to about 1.5 μm and the peak per inch PPI is about 180 to about 250, as the surface roughness properties of the roller for temper rolling, an Ra of about 1.4 to about 4.0 μm and a PPI of about 220 to about 320 are preferable.

In the spectral analysis, as a method for increasing the ratio of the area of the amplitude curve in the range of from 25 to 200 μm in wavelength, there may be a method in which the amplitude in the range of 200 μm or more in wavelength, that is, the undulating component (component in a longer wavelength region) of the steel sheet, is decreased. To decrease the undulating component, a method has been proposed in which temper rolling is performed using a specific roller. However, we found that the undulation component of the steel sheet could not be sufficiently decreased by the temper rolling described above and could be significantly decreased in tandem rolling. When the Wca of the surface of the steel sheet after tandem rolling is controlled to be about 0.8 μm or less, the amplitude in the range of 200 μm or more in wavelength, that is, the undulating component of the steel sheet (component in a longer wavelength region), is decreased, and as a result, the area ratio of the amplitude curve in the range of from 25 to 200 μm in wavelength can be increased. The surface of the steel sheet having a Wca of about 0.8 μm or less after tandem rolling can be obtained when a roller processed by electric discharging, laser processing, or the like is used for tandem rolling.

EXAMPLES

Next, examples of the invention will be described.

Example 1

Samples shown in Tables 3 and 4 were prepared by the steps: in which (1) an annealed cold-rolled steel sheet SPCE was sequentially processed by temper rolling (for adjusting the surface roughness) and electroplating (for forming the first coating layer), followed by the formation of the second coating layer and the formation of the third coating layer when necessary; or in which (2) an annealed cold-rolled steel sheet SPCE was sequentially processed by immersion in a bath (for hot-dip plating or the like), heating and alloying treatment when necessary, and temper rolling (for adjusting the surface roughness), followed by the formation of the second coating layer and the formation of the third coating layer when necessary.

The arithmetic mean roughness Ra and the peak per inch PPI of each sample thus formed were measured by a surface roughness meter provided with a probe having a top diameter of 5 μm (manufactured by Tokyo Seimitsu Co., Ltd.). At a scanning speed of 0.3 mm/sec, the arithmetic mean roughness Ra defined by JIS B 0601-1994 was measured with a cut-off value of 0.8 mm and a measurement length of 4 mm, and the peak per inch PPI was measured with a cut-off of 0.8 mm and a measurement length of 8 mm. The spectral analysis was performed by an analytical apparatus manufactured by Meishin Koki Co., Ltd.

TABLE 3

| | Properties of Coating Layer | | | | | | Surface Roughness | | |
|---|---|---|---|---|---|---|---|---|---|
| | Type of First Coating Layer | First Coating Layer g/m$^2$ | Second Coating Layer | Second Coating Layer g/m$^2$ | Presence of Third Coating Layer | Third Coating Layer g/m$^2$ | Ra (μm) | PPI | Area (%)*2) |
| Example 1 | Electro-galvanized Layer | 30 | Zinc Phosphate layer | 1.2 | No | — | 1.5 | 210 | 22 |
| Example 2 | Electro-galvanized Layer | 50 | Zinc Phosphate Layer | 1.5 | No | — | 1.1 | 240 | 35 |
| Example 3 | Electro-galvanized Layer | 50 | Zinc Phosphate layer | 2.0 | No | — | 0.7 | 206 | 24 |
| Example 4 | Galvan-nealed Layer | 45 | Zinc Phosphate layer | 2.5 | No | — | 0.8 | 220 | 28 |
| Example 5 | Hot-Dip Galvanized Layer | 60 | Zinc Phosphate Layer | 1.5 | No | — | 1.3 | 190 | 20 |
| Example 6 | Hot-Dip Galvanized Layer | 40 | Zinc Phosphate Layer | 2.0 | No | — | 1.1 | 240 | 23 |
| Example 7 | Zinc-Nickel alloy electroplated Layer | 20 | Chromate Layer | 0.1 | Yes*1) | 0.5 | 0.7 | 200 | 33 |
| Example 8 | Zinc Phosphate Layer | 1.5 | Organic Resin Layer | 1.0 | No | — | 1.3 | 210 | 30 |
| Example 9 | Electro-galvanized Layer | 30 | Zinc Phosphate Layer | 1.5 | Yes*1) | 0.1 | 1.3 | 220 | 20 |

| | Appearance Evaluation of Electrodeposition painting 1 | | Appearance Evaluation of Electrodeposition painting 2 | | Press Formability | |
|---|---|---|---|---|---|---|
| | Polishing | Sliding | Polishing | Sliding | Punching Force (kN) | Wall Damage |
| Example 1 | good | good | good | good | 37 | good |
| Example 2 | excellent | excellent | excellent | excellent | 35 | good |
| Example 3 | good | good | good | good | 38 | good |
| Example 4 | excellent | excellent | excellent | excellent | 36 | good |
| Example 5 | good | good | good | good | 36 | good |

TABLE 3-continued

| | | | | | | |
|---|---|---|---|---|---|---|
| Example 6 | good | good | good | good | 37 | good |
| Example 7 | excellent | excellent | excellent | excellent | 35 | good |
| Example 8 | excellent | excellent | excellent | excellent | 34 | good |
| Example 9 | good | good | good | good | 36 | good |

*1)Organic Resin layer
*2)Area obtained from an amplitude curve of 25–200 μm in wavelength

TABLE 4

| | Properties of Coating Layer | | | | | | Surface Roughness | | |
|---|---|---|---|---|---|---|---|---|---|
| | First Coating Layer | First Coating Layer g/m$^2$ | Second Coating Layer | Second Coating Layer g/m$^2$ | Presence of Third Coating Layer | Third Coating Layer g/m$^2$ | Ra (μm) | PPI | Area (%)*2) |
| Comparative Example 1 | Electro-galvanized Layer | 30 | Zinc Phosphate Layer | 0.5 | No | — | 0.5 | 190 | 10 |
| Comparative Example 2 | Electro-galvanized Layer | 30 | Zinc Phosphate Layer | 1.5 | No | — | 2.5 | 280 | 26 |
| Comparative Example 3 | Electro-galvanized Layer | 50 | Zinc Phosphate Layer | 1.5 | No | — | 0.6 | 150 | 33 |
| Comparative Example 4 | Electro-galvanized Layer | 50 | Zinc Phosphate Layer | 1.5 | Yes*1) | 0.1 | 1.3 | 160 | 27 |
| Comparative Example 5 | Hot-Dip Galvanized Layer | 60 | Zinc Phosphate Layer | 0.8 | No | — | 1.2 | 160 | 20 |
| Comparative Example 6 | Zinc-Nickel alloy electroplated Layer | 20 | Chromate Layer | 0.1 | Yes*1) | 0.5 | 1.5 | 140 | 29 |

| | Appearance Evaluation of Electrodeposition painting 1 | | Appearance Evaluation of Electrodeposition painting 2 | | Press Formability | |
|---|---|---|---|---|---|---|
| | Polishing | Sliding | Polishing | Sliding | Punching Force (kN) | Wall Damage |
| Comparative Example 1 | poor | poor | poor | poor | 37 | good |
| Comparative Example 2 | poor | poor | poor | poor | 36 | poor |
| Comparative Example 3 | poor | poor | good | good | 40 | good |
| Comparative Example 4 | poor | poor | poor | poor | 36 | good |
| Comparative Example 5 | poor | poor | poor | poor | 38 | good |
| Comparative Example 6 | poor | poor | poor | poor | 38 | good |

*1)Organic Resin layer
*2)Area obtained from an amplitude curve of 25–200 μm in wavelength In this example, the surface roughness of the roller for temper rolling was changed from 0.8 to 6 μm in Ra and from 170 to 350 in PPI and the rate of elongation of a steel sheet in temper rolling was set to 0.7 to 0.8%, thereby forming samples each having a thickness of 0.75 mm. Test pieces were obtained from the samples thus formed and were then rubbed, and electrodeposition painting was performed for the test pieces thus treated for evaluation of paintability. In addition, press formability of the samples was also evaluated. The results are shown in Table 3 and 4.

(Electrodeposition Paintability)

The appearance of the electrodeposition painting was evaluated by two methods in accordance with evaluation 1 and evaluation 2 described below. When the appearance was accepted by both evaluation 1 and 2, it was recognized that the electrodeposition paintability was superior.

Evaluation 1

After polishing or friction test under the conditions described below, the test piece was electrodeposition painted, and the finished surface of the electrodeposition painting on a surface which was polished, indicated by numeral 1 shown in FIG. 1A, and the finished surface of the electrodeposition painting on a surface which was rubbed with a die, indicated by numeral 2 shown in FIG. 1B, were evaluated by visual inspection. The surface which was observed orange peel was represented by poor, the surface which was not observed orange peel was represented by good and the surface having superior appearance was represented by excellent. The surface of the electrodeposition painting, which was not accepted, had to be polished to be smooth before a top coat is formed thereon.

Figure 1A:
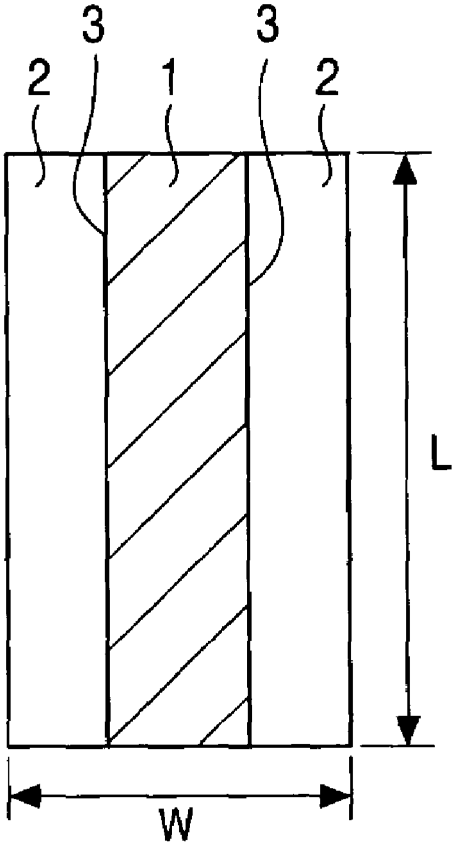
FIG. 1A is a plan view showing a test piece used for polishing.
Figure 1B:
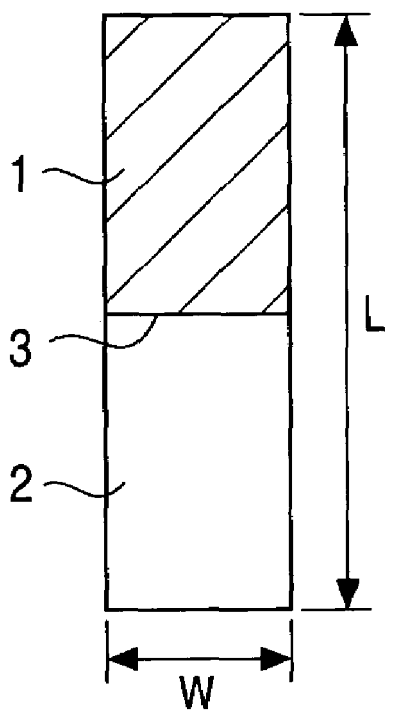
FIG. 1B is a plan view showing a test piece used for a friction test with parallel flat dies.

FIG. 1A shows a plan view of a test piece for polishing evaluation, and numeral 3 indicates a boundary line between the surface 1 which is polished and a surface 2 which is not polished. In addition, FIG. 1B shows a plan view of a test piece for the friction test, and numeral 3 indicates a boundary line between the surface 1 which is rubbed and a surface 2 which is not rubbed. In the figures, L indicates the length of the test piece, and W indicates the width of the test piece.

Evaluation 2

After polishing or friction test under the conditions described below, the test piece was electrodeposition painted was performed, and the evaluation was then performed whether the boundary line 3 between the surface which was polished (rubbed) and the surface which was not polished (rubbed) was clearly observed or not by visual inspection. The case in which the boundary line was clearly observed was represented by poor, the case in which the boundary line was not substantially observed was represented by good, and the case in which the boundary line could not be observed at all was represented by excellent. When the boundary line was clearly observed, which was represented by poor, the electrodeposition painting had to be polished to be smooth before a top coat is formed thereon.

(Method of Electrodeposition Painting)

In a manner similar to an automobile body manufacturing process, after polishing or friction test under the conditions described below, the test piece was sequentially processed by alkaline degreasing, surface adjustment, and phosphate treatment. Subsequently, after electrodeposition painting, an electrodeposition painting (a target thickness of 17 μm at a surface which was not polished and was not rubbed) was formed by firing. The conditions thereof are shown below.

Alkaline Degreasing Agent: Gardclean (manufactured by Chemetall Gmbh)

Surface Adjustment Agent: Gardlone Z2 (manufactured by Chemetall Gmbh)

Phosphate Treatment: The steel sheet was immersed in a solution of Gardbond (manufactured by Chemetall Gmbh) at 50° C. for 2 minutes.

Electrodeposition Painting

Electrodeposition Paint: EC3000 (a bath temperature of 28 to 30° C.), (manufactured by Harberts)

Electrodeposition Voltage: 170 V for 180 seconds

Firing conditions: 185° C. for 20 minutes (Polishing Method)

An abrasive paper of #2000, provided with a flat weight of 1.7 kg having a bottom surface 50 mm×50 mm thereon, was placed on a surface of the test piece and was slid along the surface thereof. The test piece obtained from each of the samples had a length L of 150 mm and a width W of 70 mm.

(Method of Friction Test)

After a surface of a test piece having a length L of 300 mm and a width W of 50 mm, which was obtained from each of the samples, was degreased by a solvent, an anti-rusting oil (Z5 manufactured by Idemitsu Kosan Co., Ltd.) was applied onto the surface at an amount of 1.5 $g/m^2$. Next, the friction test was performed at room temperature by using a sliding tester provided with a die under the conditions in which an application pressure was 7,800 MPa and a sliding speed was 1,000 mm/minute. The die used for this test had a press area of 10 mm in the longitudinal direction of the test piece by 50 mm in the width direction thereof.

(Press Formability)

From each sample, a sheet having a blank diameter of 90 mm was punched out, and by using this sheet, a cylinder was formed using a punch having a diameter of 50 mm and a dice having a diameter of 52 mm under the conditions in which a blank holding pressure was 10 kN and the punch speed was 120 mm/minute. Press formability was evaluated from the punching force and the degree of damage done to the wall of the cylinder. When the punching force was 39 kN or less, and the damage observed by visual inspection was slight, the press formability was determined to be superior and was represented by good, and when the punching force was more than 39 kN or the damage observed by visual inspection was not slight, the press formability was determined to be inferior and was represented by poor.

As can be seen from the evaluation results of the appearance obtained after the electrodeposition painting shown in Tables 3 and 4, it is understood that samples (examples 1 to 9) having the surface roughness properties within the scope of the invention each have superior appearance of the electrodeposition painting formed on the surface which is rubbed as compared to that of each of samples of comparative examples 1 to 6 having the surface roughness properties outside the scope of the present invention. In particular, according to the spectral analysis, in examples 2, 4, 6, 7, and 8, the area of the amplitude in the range of from 25 to 200 μm in wavelength is 25% or more of that in the range of from 25 to 1,000 μm in wavelength, and hence a significantly superior appearance of the electrodeposition painting can be obtained.

What is claimed is:

1. A coated steel sheet provided with an electrodeposition painting having a superior appearance, the coated steel sheet comprising:

a steel sheet; and at least two coating layers on the steel sheet, wherein the coated steel sheet has surface roughness properties, in which an arithmetic mean roughness Ra as defined by JIS B 0601-1994, is in the range of from about 0.7 to about 1.5 μm and a peak per inch PPI is in the range of from about 180 to about 250.

2. The coated steel sheet according to claim 1, wherein, in a spectral analysis obtained by Fourier transformation of a surface roughness measurement curve, an area obtained from an amplitude curve in the range of from 25 to 200 μm in wavelength is about 25% or more of the area obtained from the amplitude curve in the range of from 25 to 1,000 μm in wavelength.

3. The coated steel sheet according to claim 1 or 2, wherein said at least two coating layers are a first coating layer formed on the steel sheet and a second coating layer formed on the first coating layer, the first coating layer is a layer selected from the group consisting of an electroplated layer, a hot-dip plated layer, and a chemical conversion layer, and the second coating layer is a layer selected from the group consisting of a zinc phosphate layer and a chromate layer.

4. The coated steel sheet according to claim 1 or 2, wherein said at least two coating layers are a first coating layer formed on the steel sheet, a second coating layer formed on the first coating layer, and a third coating layer formed on the second coating layer, the first coating layer is a layer selected from the group consisting of an electroplated layer, a hot-dip plated layer, and a chemical conversion layer, the second coating layer is a layer selected from the group consisting of a zinc phosphate layer and a chromate layer, and the third coating layer is a layer selected from the group consisting of an organic layer, an inorganic layer, and a chemical conversion layer.

5. The coated steel sheet according to claim 1 or 2, wherein the arithmetic means roughness Ra is in the range of from about 0.8 to about 1.3 μm.

6. The coated steel sheet according to claim 1 or 2, wherein the peak per inch PPI is in the range of from about 190 to about 240.

7. A coated steel sheet provided with an electrodeposition painting having a superior appearance, the coated steel sheet comprising:

a steel sheet;

a zinc-based plated layer formed on a surface of the steel sheet; and a zinc phosphate layer formed on a surface of the plated layer, wherein the coated steel sheet has surface roughness properties, in which an arithmetic mean roughness Ra as defined by JIS B 0601-1994, is in the range of from about 0.7 to about 1.5 μm and a peak per inch PPI is in the range of from about 180 to about 250.

8. The coated steel sheet according to claim 7, wherein, in a spectral analysis obtained by Fourier transformation of a surface roughness measurement curve, an area obtained from an amplitude curve in the range of from 25 to 200 μm in wavelength is about 25% or more of the area obtained from the amplitude curve in the range of from 25 to 1,000 μm in wavelength.

9. The coated steel sheet according to claim 7 or 8, wherein the zinc-based plated layer has a plating amount of about 20 to about 60 $g/m^2$.

10. The coated steel sheet according to claim 7 or 8, wherein the zinc phosphate layer has a coating amount of about 1.0 to about 3.0 $g/m^2$.

11. The coated steel sheet according to claim 7 or 8, wherein the arithmetic means roughness Ra is in the range of from about 0.8 to about 1.3 μm.

12. The coated steel sheet according to claim 7 or 8, wherein the peak per inch PPI is in the range of from about 190 to about 240.

* * * * *